(12) United States Patent
Murashige

(10) Patent No.: US 10,654,357 B2
(45) Date of Patent: May 19, 2020

(54) VEHICLE COMPARTMENT LOWER PORTION STRUCTURE

(71) Applicant: TOYOTA JIDOSHA KABUSHIKI KAISHA, Toyota-shi, Aichi-ken (JP)

(72) Inventor: Norihiro Murashige, Nissin (JP)

(73) Assignee: TOYOTA JIDOSHA KABUSHIKI KAISHA, Tokyo (JP)

(*) Notice: Subject to any disclaimer, the term of this patent is extended or adjusted under 35 U.S.C. 154(b) by 6 days.

(21) Appl. No.: 16/210,137

(22) Filed: Dec. 5, 2018

(65) Prior Publication Data

US 2019/0184820 A1 Jun. 20, 2019

(30) Foreign Application Priority Data

Dec. 18, 2017 (JP) .................................. 2017-241641

(51) Int. Cl.
| | |
|---|---|
| *B62D 21/15* | (2006.01) |
| *B62D 25/20* | (2006.01) |
| *B60K 15/063* | (2006.01) |
| *B60K 15/067* | (2006.01) |

(52) U.S. Cl.
CPC .......... *B60K 15/067* (2013.01); *B62D 21/157* (2013.01); *B62D 25/2036* (2013.01); *B60K 2015/0634* (2013.01); *B60K 2015/0635* (2013.01); *B62D 25/20* (2013.01)

(58) Field of Classification Search
CPC .. B62D 21/157; B62D 25/20; B62D 25/2036; B60K 15/067; B60K 15/07; B60K 2015/0675; B60K 2015/0634; B60K 2015/0635

USPC ............................................ 296/187.08, 204
See application file for complete search history.

(56) References Cited

U.S. PATENT DOCUMENTS

| | | | |
|---|---|---|---|
| 6,299,239 B1 * | 10/2001 | Sagawa ................ | B60N 2/4235 |
| | | | 296/187.12 |
| 10,081,242 B2 * | 9/2018 | Okawachi ........ | B60K 15/03006 |
| 2005/0211496 A1 | 9/2005 | Ito et al. | |
| 2009/0133948 A1 | 5/2009 | Ijaz et al. | |
| 2016/0200191 A1 | 7/2016 | Ito et al. | |
| 2018/0257509 A1 * | 9/2018 | Aishima ................. | B60L 50/71 |
| 2018/0272863 A1 * | 9/2018 | Otsura ................... | B60K 13/04 |

(Continued)

FOREIGN PATENT DOCUMENTS

| | | | | |
|---|---|---|---|---|
| CN | 101039813 A | | 9/2007 | |
| DE | 102017005526 | * | 1/2018 | ..... B60K 2015/0635 |
| DE | 102016223749 A1 | | 5/2018 | |

(Continued)

*Primary Examiner* — Gregory A Blankenship
(74) *Attorney, Agent, or Firm* — Oliff PLC

(57) ABSTRACT

A cylindrical hydrogen tank is housed under a floor tunnel, which is disposed at the center in a vehicle width direction of a floor panel along a vehicle front-back direction so as to protrude upward along a height direction, and includes a casing having a load bearing property. A seat cross member is disposed on a side of the hydrogen tank along the vehicle width direction. A seat pipe is joined to the seat cross member and disposed so as to extend along the vehicle width direction. The seat pipe and the seat cross member are arranged within the height of the hydrogen tank in a vehicle height direction, and also respectively located above and below the most outwardly protruded lateral end point in the vehicle width direction of the hydrogen tank.

2 Claims, 5 Drawing Sheets

(56) References Cited

U.S. PATENT DOCUMENTS

2019/0184820 A1\* 6/2019 Murashige ........... B60K 15/067

FOREIGN PATENT DOCUMENTS

| JP | 2004-26117 A | 1/2004 |
| --- | --- | --- |
| JP | 2005-225414 A | 8/2005 |
| JP | 2006-168527 A | 6/2006 |
| JP | 2016-130103 A | 7/2016 |

\* cited by examiner

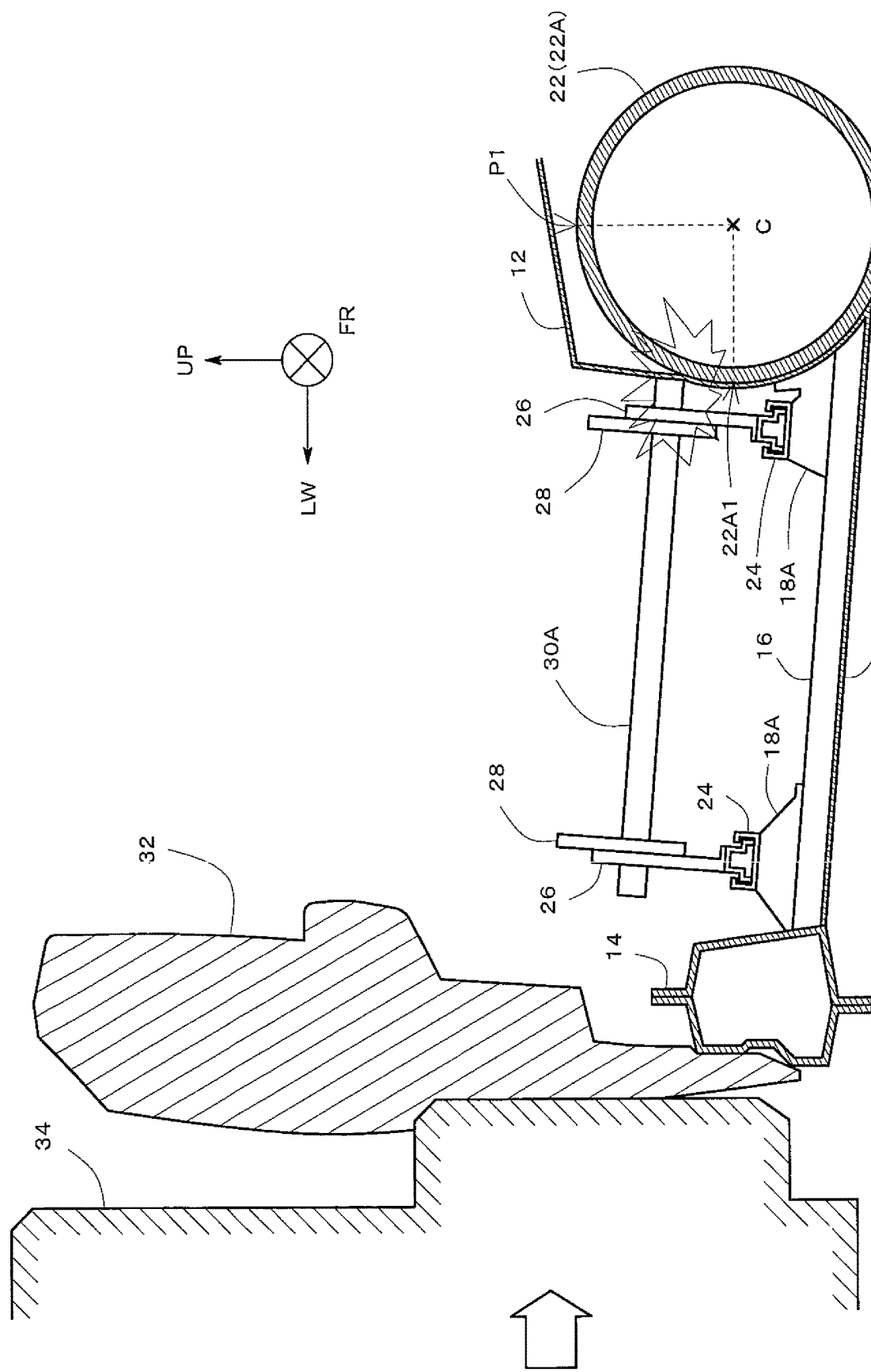

VEHICLE COMPARTMENT LOWER PORTION STRUCTURE

CROSS REFERENCE TO RELATED APPLICATION

This application claims priority to Japanese Patent Application No. 2017-241641, filed on Dec. 18, 2017, which is incorporated herein by reference in its entirety.

TECHNICAL FIELD

The present disclosure relates to a vehicle compartment lower portion structure, and in particular, relates to a vehicle compartment lower portion structure of a vehicle on which a hydrogen tank is mounted.

BACKGROUND

A floor tunnel is disposed on a floor panel, which is a floor board of a vehicle compartment (cabin) in which an occupant is accommodated. The floor tunnel is protrudingly extended along a vehicle front-back direction at the center in a vehicle width direction so as to divide the vehicle compartment between a driver seat and a passenger seat.

Conventionally, an exhaust pipe for directing exhaust gas from an internal combustion engine to a rear portion of a vehicle has been extended within the floor tunnel. However, for fuel cell vehicles which need no internal combustion engine and therefore need no exhaust pipe, it has been suggested that a hydrogen tank which is a fuel tank be disposed in place of the exhaust pipe within the floor tunnel.

Meanwhile, a seat cross member, which is a frame member, is disposed so as to extend from the floor tunnel toward a vehicle lateral end; i.e., along a vehicle width direction. An outer end portion in the vehicle width direction of the seat cross member is connected to a rocker panel which is another frame member disposed on the vehicle lateral end so as to extend along a vehicle front-back direction.

When a vehicle collides on its side (hereinafter referred to as a side collision as appropriate), a collision load is input to an inner region in the vehicle width direction. The collision load causes the rocker panel and the seat cross member to be displaced toward (stuck into) the floor tunnel located at the center of the vehicle compartment. Here, in JP 2016-130103 A, for example, a cushioning member composed of a rubber block is disposed between a hydrogen tank and a seat cross member to protect the hydrogen tank placed under the floor tunnel. At the occurrence of a side collision, the cushioning member is crushed and deformed, while functioning as, so to speak, a sacrifice for the hydrogen tank, to thereby protect the hydrogen tank.

Meanwhile, casings of hydrogen tanks mounted on vehicles are required to have a load bearing property. For example, it is required that the load bearing property be, for example, a load bearing capacity high enough to prevent hydrogen leakage from the hydrogen tank even in an unlikely event that the vehicle is destroyed by a collision. To satisfy such a requirement, the casing may be designed, in some cases, by specifications so as to withstand a far greater load (for example, approximately ten times greater) than a collision load which will be input to the hydrogen tank at the occurrence of a side collision. In such cases; i.e., when a robust hydrogen tank is mounted, it is desirable that a phenomenon of getting squashed be prevented from occurring in components around the hydrogen tank, such as the above-described rubber cushioning member, to thereby minimize the extent that a vehicle compartment space is reduced in size in the vehicle width direction.

SUMMARY

The present disclosure relates to a vehicle compartment lower portion structure. The structure includes a cylindrical hydrogen tank, a seat cross member, and a seat pipe. The cylindrical hydrogen tank is housed under a floor tunnel which is disposed at the center in a vehicle width direction of the floor panel so as to extend along a vehicle front-back direction and protrude upward in a height direction, and is equipped with a casing having a load bearing property. The seat cross member is disposed on a side of the hydrogen tank so as to extend along the vehicle width direction. The seat pipe is joined to the seat cross member and extended along the vehicle width direction. The seat pipe and the seat cross member are arranged within the height of the hydrogen tank in a vehicle height direction and also respectively located above and below a lateral end point of the hydrogen tank, the lateral end point being the most outwardly protruding portion of the hydrogen tank in the vehicle width direction.

According to the above-described structure, the seat cross member is caused to bump against the hydrogen tank at the occurrence of a side collision. Following this, the seat cross member placed below the lateral end point of the cylindrical hydrogen tank is forced to sink under the hydrogen tank while sliding along the surface of the hydrogen tank. At a certain point of the sinking, the seat pipe joined to the seat cross member and placed above the lateral end point of the hydrogen tank is hitched to the hydrogen tank, which hampers the seat cross member from sinking further below. As a result, a load of the side collision is received by the seat cross member, the seat pipe, and the hydrogen tank equipped with the casing having the load bearing property, which can, in turn, protect the vehicle compartment from getting squashed in the vehicle width direction.

In an aspect of this disclosure, it is not necessary that any cushioning member be installed between the hydrogen tank and the seat cross member.

In the structure according to the above aspect, because the cushioning member may be omitted, it is possible to place the hydrogen tank and the seat cross member closer to each other, which can contribute to minimization of the extent to which the vehicle compartment is reduced in size or squashed in the width direction.

According to this disclosure, a decrease in a vehicle compartment space along the vehicle width direction resulting from a side collision can be minimized as compared with prior arts.

BRIEF DESCRIPTION OF DRAWINGS

An embodiment of the present disclosure will be described by reference to the following figures, wherein like reference signs refer to like components in several views, and wherein:

FIG. 5 is a diagram (a third diagram of three diagrams) illustratively showing the state, at the side collision, of the vehicle compartment lower portion structure according to the embodiment.

DESCRIPTION OF EMBODIMENT

A frame structure of a vehicle front portion according to an embodiment will be described with reference to FIGS. 1 to 5. It should be noted that, in FIGS. 1 to 5, an axis designated by reference sign FR represents a vehicle front-back direction (hereinafter, simply referred to as a front-back direction where deemed appropriate), an axis designated by reference sign LW represents a vehicle width direction (hereinafter, simply referred to as a width direction where deemed appropriate), and an axis designated by reference sign UP represents a vertical direction. The reference sign FR is an abbreviation of the term "front," and the front-back direction axis FR is defined with its positive direction on a vehicle front side. The reference sign LW is an abbreviation of the term "Left Width," and the width direction axis LW is defined with its positive direction on a width left side. Further, the height axis UP is defined with its positive direction on an upper side.

Figure 1:
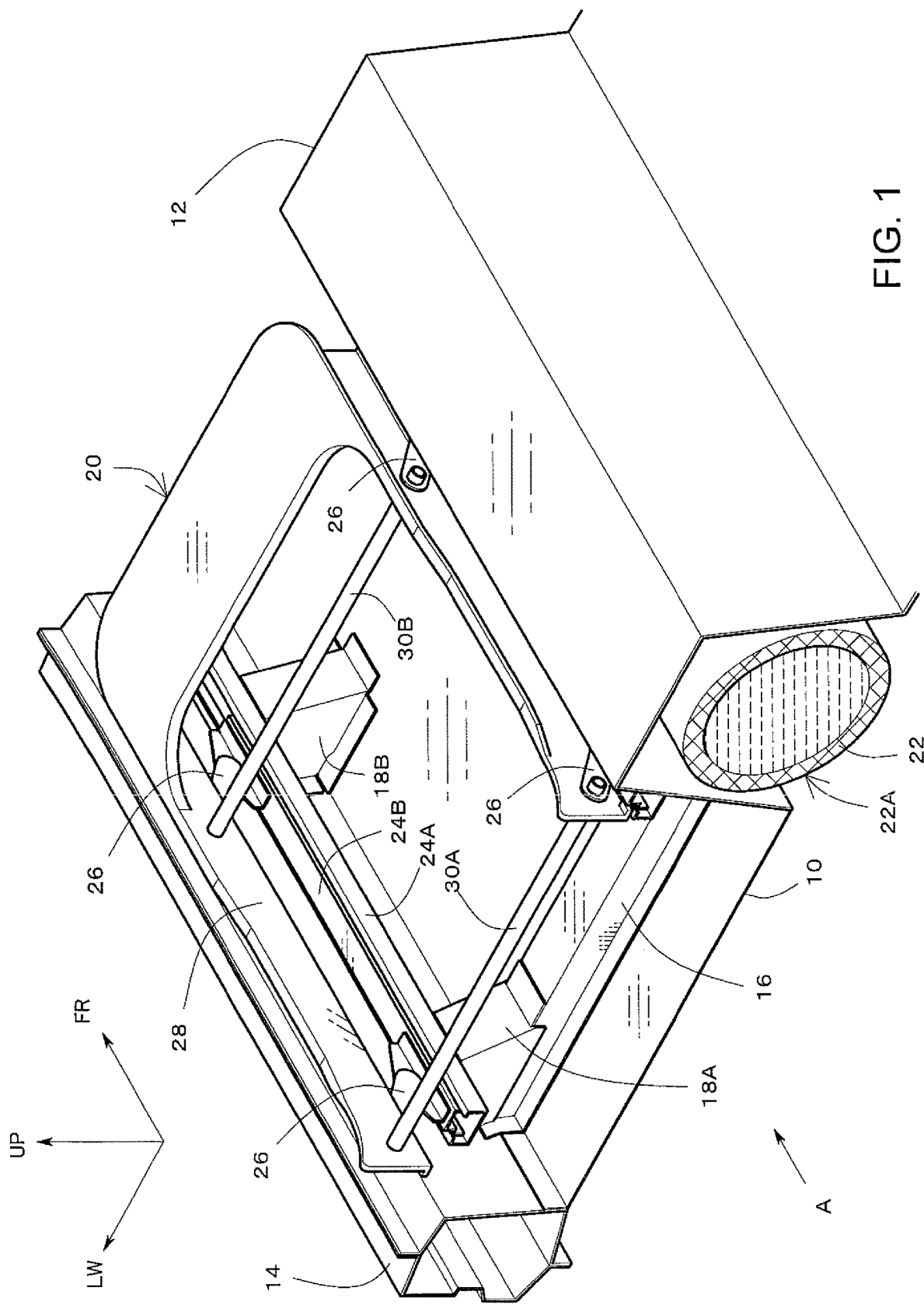
FIG. 1 is a perspective cross sectional view illustratively showing a vehicle compartment lower portion structure according to an embodiment.

As shown in FIG. 1, the axis FR, the axis LW, and the axis UP are orthogonal to each other. In the following description, the frame structure of the vehicle front portion according to the embodiment will be explained with reference to the three axes FR, LW, and UP as appropriate. For example, the expression "front end" denotes an end portion, on a positive direction side of the axis FR, of an arbitrary component, while the expression "rear end" denotes an end portion, on a negative direction side of the axis FR, of an arbitrary component. The expression "width inner side" denote a region which is located inward in the width direction of the vehicle along the axis LW, and the expression "width outer side" denotes a region which is located outward in the width direction of the vehicle along the axis LW. In addition, the expression "upper side" denotes a positive direction side of the axis UP, and the expression "lower side" denotes a negative direction side of the axis UP.

Figure 2:
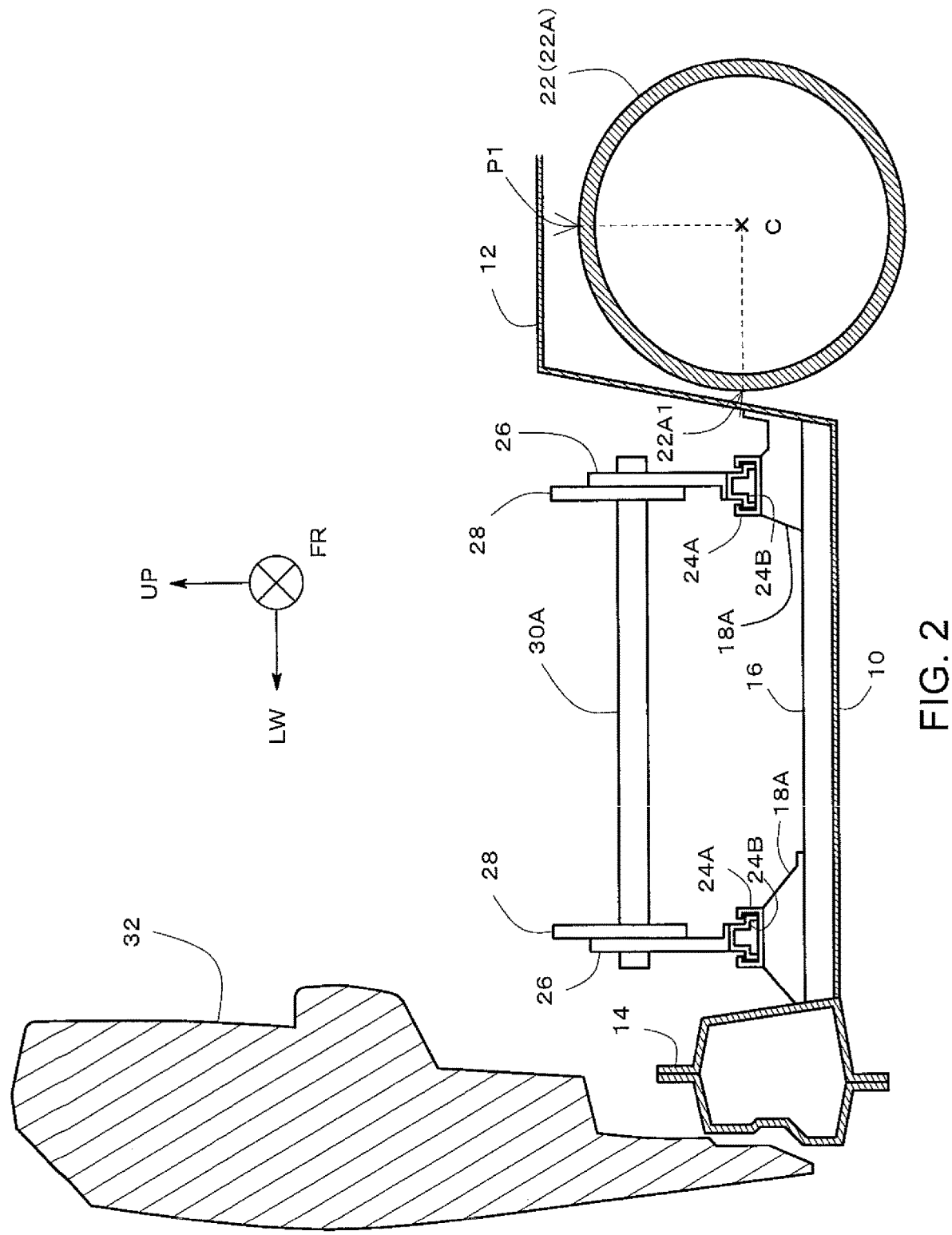
FIG. 2 is a cross sectional view illustratively showing the vehicle compartment lower portion structure according to the embodiment, as viewed from a rear side.

FIG. 1 is a perspective view illustratively showing a vehicle compartment lower portion structure according to the embodiment. FIG. 2 is a cross sectional view illustratively showing the vehicle compartment lower portion structure as viewed from a rear side along an arrow A indicated in FIG. 1. It should be noted that a vehicle to which the vehicle compartment lower portion structure according to the embodiment is applied is a fuel cell vehicle equipped with a hydrogen tank. FIG. 1 illustratively shows components around a left seat in a front region of a vehicle compartment. It is to be understood in light of a symmetrical property of vehicle structure that components around a right seat in the front region of the vehicle compartment are similar to those around the left seat.

The vehicle compartment lower portion structure according to the embodiment includes a floor panel 10, a floor tunnel 12, a rocker panel 14, a seat cross member 16, a seat bracket 18, a seat unit 20, and a hydrogen tank 22.

The floor panel 10 is a floorboard panel of the vehicle compartment, and an outer end portion in the width direction of the floor panel 10 is connected to the rocker panel 14. Further, on the center in the width direction of the floor panel 10, the floor tunnel 12 is placed along the front-back direction so as to be protruded upward in a height direction (along the positive direction of the axis UP). In addition, right and left front seats (a driver seat and a passenger seat) are placed above the floor panel 10 so as to sandwich the floor tunnel 12.

The floor panel 10 and the floor tunnel 12 may be individually formed of, for example, separate panel members. Floor panels 10, 10 may be arranged, for example, on both sides of the floor tunnel 12, and each inner end in the width direction of the floor panels 10, 10 may be joined by welding or other means to a corresponding one of outer ends in the width direction of the floor tunnel 12.

The floor tunnel 12 is formed as a so-called square tunnel when viewed from the rear side, and is configured to house the hydrogen tank 22 in a space under the floor tunnel 12. In other words, the hydrogen tank 22 is mounted on the vehicle with its longitudinal direction aligned with the vehicle front-back direction.

In addition, the hydrogen tank 22 is supported from the floor tunnel 12 by a support means such as a bracket (not illustrated). For example, as shown in FIG. 2, the hydrogen tank 22 is supported from the floor tunnel 12 in such a manner that the center C of a cross section circle of the hydrogen tank 22 is located above the seat bracket 18 (seat brackets 18A).

The hydrogen tank 22 is configured to supply hydrogen to a fuel cell mounted on the vehicle. A casing 22a for storing hydrogen in the hydrogen tank 22 is formed in a cylindrical shape, and more specifically, is formed in a so-called cocoon shape composed of a cylinder portion extending along a longitudinal direction of the casing 22a and dome portions (not illustrated) attached to both end portions in the longitudinal direction of the cylinder portion. Further, apexes of the dome portions; i.e., both ends in the longitudinal direction of the casing 22A, are equipped with mouth fittings (not illustrated) used for introducing hydrogen into the casing 22A and supplying hydrogen from the casing 22A to a fuel cell stack.

The hydrogen tank 22 is a so-called high pressure tank, and the casing 22A has a sufficiently high strength in terms of pressure tightness. For example, the casing 22A is designed to include, from an inner surface layer, a plastic liner layer for shutting in hydrogen, a CFRP plastic layer wound by a carbon fiber reinforced plastic (CFRP), and a GFRP plastic layer wound by a glass fiber reinforced plastic (GFRP) for surface protection.

In addition, the casing 22A has a load bearing property. For example, the casing 22A has a high load bearing capacity sufficient to withstand a load which is approximately 15 times an input load applied during a side collision test. Having the high load bearing capacity can ensure that leakage of hydrogen from the hydrogen tank 22 is prevented even in an unlikely event that the vehicle is destroyed through a collision.

The seat cross member 16 is a frame member disposed on the floor panel 10 below the seat unit 20 so as to be extended along the vehicle width direction, and functions to protect a seat space from getting squashed in the width direction at the occurrence of a side collision. The seat cross member 16 has, in cross section, a so-called hat shape with a flange corresponding to a brim of a hat, and the flange is attached to the floor panel 10. The seat cross member 16 and the floor panel 10 attached to the seat cross member 16 define a closed structure in cross section.

An inner end portion in the width direction of the seat cross member 16 is joined to the floor tunnel 12, while an outer end portion in the width direction of the seat cross member 16 is joined to the rocker panel 14. That is, as illustrated in the diagram of FIG. 2 viewed from the rear side, the seat cross member 16 is arranged on a side of the hydrogen tank 22 and is extended to the rocker panel 14.

Here, it is not necessary to install a member for protecting the hydrogen tank 22, such as a cushioning member, between the hydrogen tank 22 and the seat cross member 16, and the seat cross member 16 and the hydrogen tank 22 may be placed closer to each other due to lack of the protecting member. Such closer placement can contribute to minimization of the extent that the vehicle compartment is reduced in size or squashed in the width direction.

In addition, the seat cross member 16 is arranged within the height of the casing 22A of the hydrogen tank 22, and also placed below a lateral end point 22A1 of the casing 22A at which the casing 22A is most outwardly protruded in the width direction. In other words, the seat cross member 16 is placed in such a manner that its upper surface is located below the center C of a cross section circle of the hydrogen tank 22.

The rocker panel 14 is a frame member which is disposed on each lateral end of the vehicle compartment so as to be extended along the front-back direction. As illustratively shown in FIGS. 1 and 2, the rocker panel 14 has a closed structure in cross section. At the occurrence of a side collision, as described below, the hydrogen tank 22 having the high load bearing capacity can function, in addition to the rocker panel 14 and the seat cross member 16, to receive the collision load, and therefore protect the vehicle compartment from getting squashed in the width direction.

The seat brackets 18 are support members for supporting the seat unit 20. For example, the seat brackets 18 support the seat unit 20 at four points consisting of two front points and two rear points. The seat brackets 18A, 18A at the rear points are jointed to the top surface of the seat cross member 16.

On the other hand, seat brackets 18B, 18B at the front points are joined to the floor panel 10. It should be noted that when another seat cross member 16 is arranged in a front portion of the seat, the seat brackets 18B, 18B at the front points may be joined to the top surface of the other seat cross member 16.

The seat unit 20 includes a seat adjuster 24, a tilt arm 26, a lifter housing 28, and a seat pipe 30. It should be noted that FIGS. 1 and 2 show only a part of the seat unit 20. Specifically, a seat cushion in the seat unit 20 and a seat back being a backrest are not illustrated in the drawings.

The seat adjuster 24 is a rail mechanism for moving the seat along the front-back direction, and a pair of right and left seat adjusters 24 are installed below the seat. Each of the seat adjusters 24 includes a seat adjuster stationary rail 24A which is arranged so as to extend along the front-back direction and fastened to the seat brackets 18A and 18B, and a seat adjuster movable rail 24B which is linearly movable on the seat adjuster stationary rail 24A.

The tilt arm 26 is disposed on the seat adjuster movable rail 24B. The tilt arm 26 is a mechanism for moving the seat along the vertical direction, and an elevation angle (a tilting angle) of the tilt arm 26 relative to the horizontal surface can be changed by operating a lifter knob (not illustrated). When the tilt arm 26 is tilt-rotated, the lifter housing 28, the seat cushion covering the lifter housing 28, and the seat back serving as the backrest are moved up or down.

The tilt arm 26 is disposed on each of front and rear end portions of the seat adjuster movable rail 24B. Because a pair of right and left seat adjuster movable rails 24B are disposed, four tilt arms 26 in total are attached to the front end portions and the rear end portions of the seat adjuster movable rails 24B, 24B.

The seat pipe 30 is disposed so as to extend along the width direction and joined to a pair of right and left tilt arms 26. The seat pipe 30 is one of the frame members of the seat, and is compose of a rear seat pipe 30A arranged on a seat rear region and a front seat pipe 30B arranged on a seat front region.

As shown in FIG. 2, the seat pipes 30 (seat pipes 30A, 30B) are arranged within the height of the casing 22A of the hydrogen tank 22, and also located above the lateral end point 22A1 of the casing 22A (above the center C of the hydrogen tank 22). For example, although the vertical position of the seat pipes 30 can be changed by tilt rotation of the tilt arm 26 as described above, the seat pipes 30 are arranged so as to be located above the lateral end point 22A1 of the hydrogen tank 22 even at the smallest tilt angle of the tilt arm 26 which is in position closest to the horizontal position.

In this way, the seat pipe 30 and the seat cross member 16 are respectively arranged above and below the lateral end point 22A1 of the hydrogen tank 22 so as to sandwich the lateral end point 22A1 between the seat pipe 30 and the seat cross member 16, which can ensure that both of the seat pipe 30 and the seat cross member 16 are hitched to the hydrogen tank 22. More specifically, the seat pipe 30 is connected (joined) via the tilt arms 26 and the seat brackets 18 to the seat cross member 16. The seat pipe 30 and the seat cross member 16 are spaced from each other in the vertical direction and extended to the hydrogen tank 22 in parallel with each other. At the occurrence of a side collision, the seat pipe 30 and the seat cross member 16 which are parallelly extended frame members are forced to bump on the hydrogen tank 22 at positions above and below the lateral end point 22A1 of the hydrogen tank 22. As a result, the seat pipe 30 and the seat cross member 16 are reliably hitched to the surface of the hydrogen tank 22 which is circular in cross section.

It should be noted that, as described above, the seat pipe 30 is arranged so as not to exceed the upper end of the hydrogen tank 22 (the highest point P1 of the hydrogen tank 22). As described above, while the vertical position of the seat pipe 30 is variable, for example, in response to tilt rotation of the tilt arm 26, the seat pipe 30 is arranged at a height that does not exceed the highest point P1 of the hydrogen tank 22 even at the highest tilt angel of the tilt arm 26 at which the tilt arm 26 is in position closest to vertical position. This can minimize a degree of sinking of the seat cross member 16 under the surface of the hydrogen tank 22 at the occurrence of a side collision, which will be described below.

State of Vehicle Compartment Lower Portion Structure at Side Collision

A state, at a side collision, of the vehicle compartment lower portion structure according to this embodiment will be described with reference to FIGS. 3 to 5. It should be noted that although only the rear seat pipe 30A is illustrated as the seat pipe 30 in the following description and FIGS. 3 to 5, the front seat pipe 30B behaves in a manner similar to the rear seat pipe 30A when the seat cross member 16 is also installed in the front portion of the seat and the seat brackets 18B, 18B are joined to the upper surface of the seat cross member 16.

Figure 3:
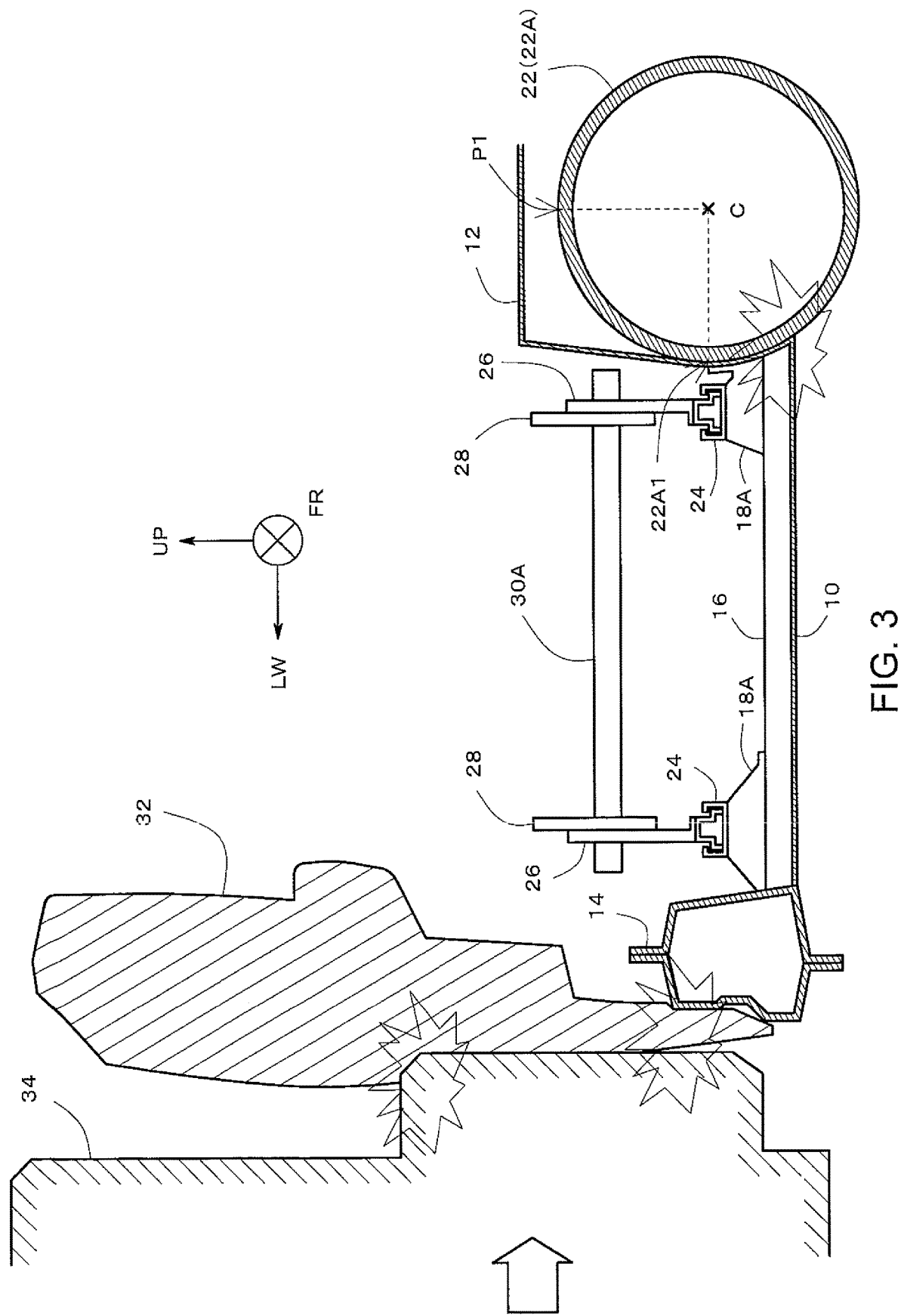
FIG. 3 is a diagram (a first diagram of three diagrams) illustratively showing a state, at a side collision, of the vehicle compartment lower portion structure according to the embodiment.
Figure 4:
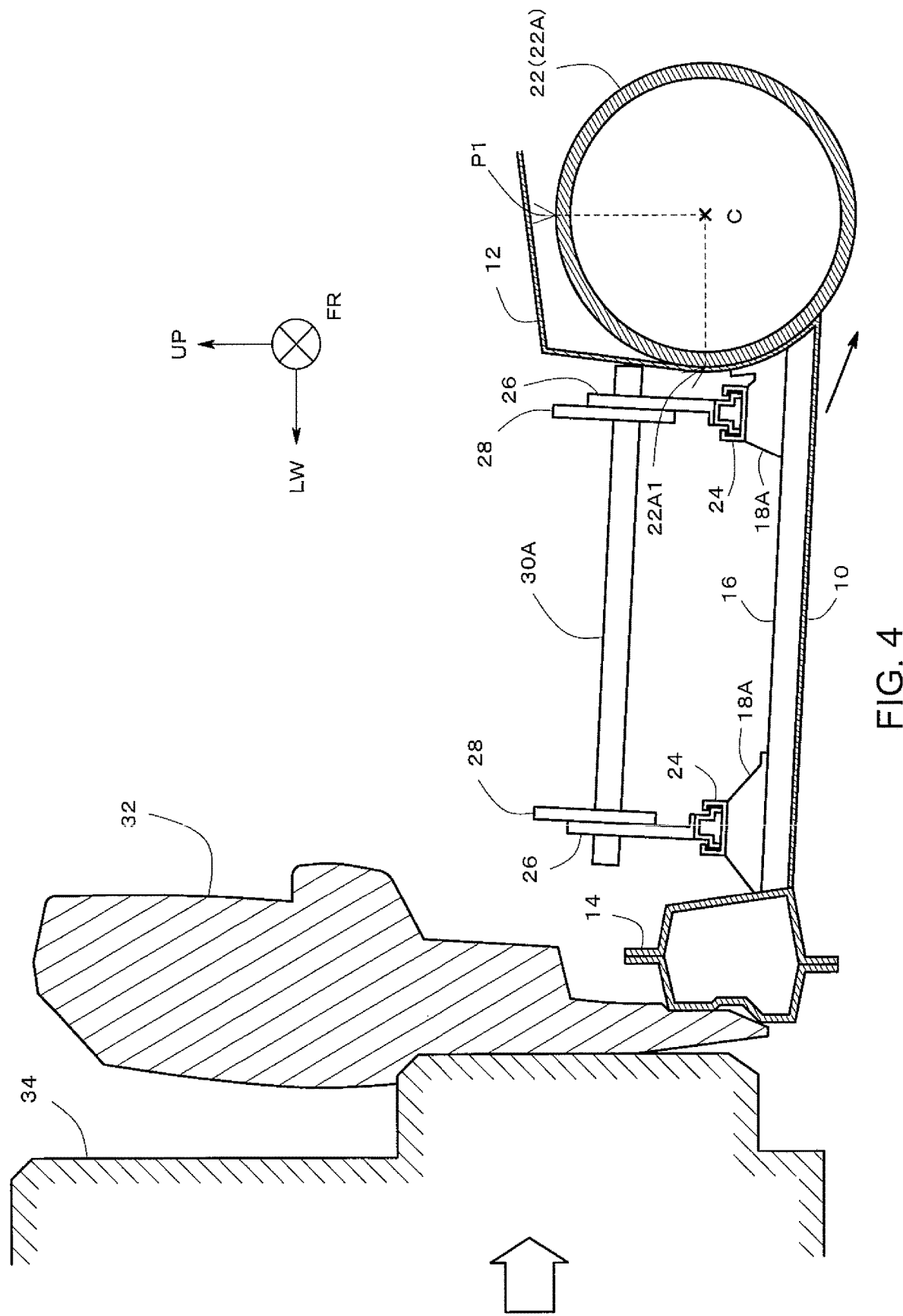
FIG. 4 is a diagram (a second diagram of three diagrams) illustratively showing the state, at the side collision, of the vehicle compartment lower portion structure according to the embodiment.

As illustrated in FIG. 3, when a vehicle collides on its side, a barrier 34 (an obstacle) hits against the vehicle from its side. Then, a front door 32 receiving the barrier 34 is displaced toward a width inner side while being deformed. At some point during the displacement, a lower end portion of an inner side surface of the front door 32 is bumped against an outer side surface of the rocker panel 14. This causes the rocker panel 14 to be displaced toward an inner region in the width direction.

In response to the displacement of the rocker panel 14, the seat cross member 16 joined to an inner side surface of the rocker panel 14 is also displaced toward the inner region in the width direction. Further, the rear seat pipe 30A connected (indirectly) to the seat cross member 16 is also displaced toward the inner region in the width direction.

Then, an inner end portion of the seat cross member 16 is bumped against the surface of the casing 22A of the hydrogen tank 22. Because, as described above, the seat cross member 16 is placed below the center C of the cross section circle of the casing 22A, the seat cross member 16 is caused, as illustratively shown in FIG. 4, to slide down along the surface of the casing 22A and sink under the casing 22A.

Accompanying the inner end portion of the seat cross member 16 which is slidingly sinking, an inner end portion of the rear seat pipe 30A joined to the seat cross member 16 is also displaced obliquely downward. When the seat cross member 16 has sunk to a certain point, an inner side face of the rear seat pipe 30A is bumped against the casing 22A.

Then, as described above, because the rear seat pipe 30A is placed upward of the center C of the cross section circle of the casing 22A, the inner side faces of the seat cross member 16 and the rear seat pipe 30A are bumped against the casing 22A at positions sandwiching the lateral end point 22A1 of the casing 22A in the vertical direction.

While a process of the side collision is progressing, the rear seat pipe 30A tries to climb up the casing 22A along the surface of the casing 22A, whereas the seat cross member 16 tries to sink under the surface of the casing 22A. Because the rear seat pipe 30A and the seat cross member 16 are connected to each other via the seat bracket 18A, the seat adjuster 24, and the tilt arm 26, movement of one of the rear seat pipe 30A and the seat cross member 16 interferes with (hinders) movement of the other. This causes a halt of displacement (the climbing and sinking) of the rear seat pipe 30A and the seat cross member 16 in the width inner side.

Here, the rear seat pipe 30A, which is placed below the peak point P1 (the upper end portion) of the casing 22A, is bumped against the casing 22A at an earlier time, which can contribute to a reduction of an amount of sinking of the seat cross member 16.

As shown in FIG. 5, the side collision load is received by the rocker panel 14, the seat cross member 16, and the casing 22A. It should be noted that when deformation of the front door 32 toward the width inner side is further advanced, the side collision load is also received by the rear seat pipe 30A. Thus, in the vehicle compartment lower portion structure according to this embodiment, focusing on the load bearing capacity of the casing 22A of the hydrogen tank 22 being far higher than the side collision load, the casing 22A is similarly utilized as one of the frame members, such as the rocker panel 14, the seat cross member 16, and the seat pipe 30. Due to the effect of receiving the side collision load at the frame members including the casing 22A, a decrease in a width dimension of the vehicle compartment space can be minimized.

It should be understood that the present disclosure is not limited to the above-described embodiment, and the present disclosure embraces all changes and modifications without departing from a technical range or the gist of the present disclosure defined in the claims.

The invention claimed is:

1. A vehicle compartment lower portion structure, comprising:
   a cylindrical hydrogen tank housed under a floor tunnel which is disposed at a center in a vehicle width direction of a floor panel so as to extend along a vehicle front-back direction and protrude upward along a height direction, the hydrogen tank including a casing having a load bearing property;
   a seat cross member disposed on a side of the hydrogen tank so as to extend along the vehicle width direction; and
   a seat pipe joined to the seat cross member and disposed so as to extend along the vehicle width direction,
   wherein the seat pipe and the seat cross member are arranged within a height of the hydrogen tank in a vehicle height direction, and also respectively located above and below a lateral end point of the hydrogen tank, the lateral end point being the most outwardly protruded point in the vehicle width direction of the hydrogen tank.

2. The vehicle compartment lower portion structure according to claim 1, wherein no cushioning member is installed between the hydrogen tank and the seat cross member.

* * * * *